(No Model.)
E. P. CHURCHWELL.
AXLE NUT.
No. 538,769. Patented May 7, 1895.
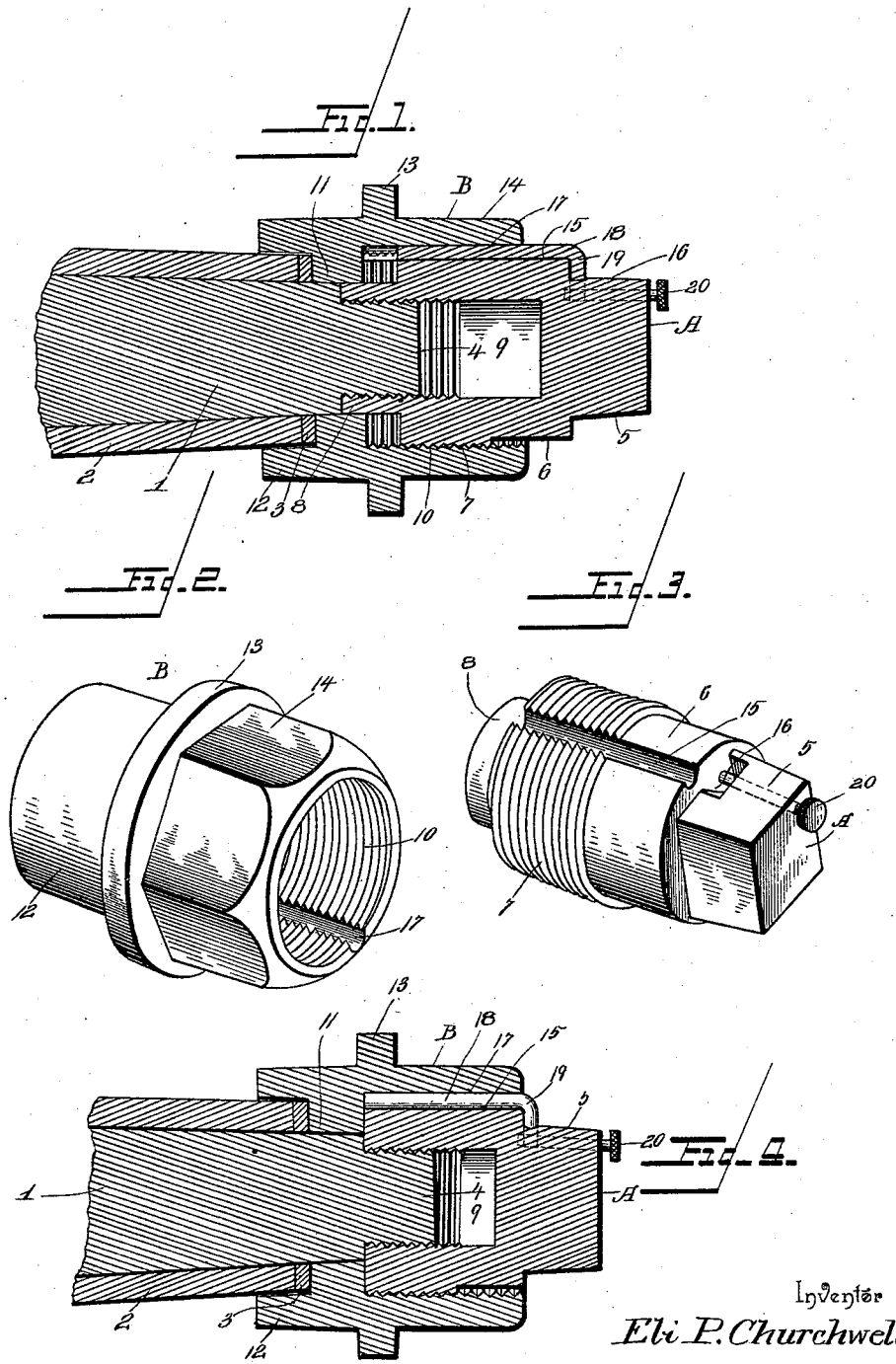
Witnesses
Thos W Riley
F. B. Clements
Inventor
Eli P. Churchwell,
By his Attorneys.
C A Snow & Co.

UNITED STATES PATENT OFFICE.

ELI P. CHURCHWELL, OF SAVANNAH, TENNESSEE.

AXLE-NUT.

SPECIFICATION forming part of Letters Patent No. 538,769, dated May 7, 1895.

Application filed November 24, 1894. Serial No. 529,829. (No model.)

*To all whom it may concern:*

Be it known that I, ELI P. CHURCHWELL, a citizen of the United States, residing at Savannah, in the county of Hardin and State of Tennessee, have invented a new and useful Axle-Nut, of which the following is a specification.

This invention relates to an improvement in that class of axle nuts which are provided especially to take up the wear existing between the axle box or hub of the wheel and the axle of a vehicle. Ordinarily these devices consist of two parts, a nut proper, operating on the nib or threaded portion of the axle, and a second part adjustable on the nut proper and capable of being moved against the end of the axle box, so as to engage the same and prevent unnecessary movement thereof.

My invention may be considered as one of this class, and the novelty thereof lies in certain peculiar features of construction, and combination and arrangement of parts as will be more fully described hereinafter and finally embodied in the claim.

In the drawings, Figure 1 represents a longitudinal section of the end of an axle-journal having my improvements applied thereto; Fig. 2, a detail perspective of the adjusting-collar; Fig. 3, a similar view of the nut proper; Fig. 4, a sectional view, similar to Fig. 1, and in illustration of a modified form of my invention.

The reference numeral 1 indicates the axle spindle, the end of which is reduced to form the threaded nib 4.

2 indicates the axle box, which is revolubly mounted on the spindle 1 and which, as usual, has the wheel connected to it. A washer 3 is arranged on the outer end of the spindle 1 and directly against the adjacent portion of the axle box 2, all of which is in accordance with the prior state of the art.

My improved axle nut comprises two main parts, the nut proper A, and the adjusting sleeve or collar B. The nut proper A consists of a cylindrical device provided at its outer end with a squared portion 5, provided to permit the connection of a wrench with the device. Adjacent to the squared portion 5 the nut proper is formed into the barrel 6, which is truly cylindrical and which has at its inner portion the threads 7. These threads occupy one-half of the barrel 6 and are slightly raised above the surface of the same.

8 indicates a flange, which is formed on the inner end of the nut proper A, and which is concentric with the same, though considerably reduced in diameter. The nut A is formed with an internal passage 9, which is threaded so that it may screw over the nib 4 of the axle journal, and by these means be connected to the same. The inner end of the flange 8 is capable of bearing up snugly against the shoulder formed by the nib 4, although it is not necessary in practical operation that this arrangement of the parts be present. The adjusting collar B is also cylindrical in shape and comprises a tubular form having an internally-threaded part 10, which is adapted to screw over the threaded portion 7 of the barrel 6, and by these means be adjustable on the nut proper A.

11 indicates an internally projecting and concentric flange, which extends inwardly sufficiently to snugly engage the outer side of the flange 8.

The construction of the parts A and B is such that they may be moved upon each other so that the flange 11 will lie completely over the flange 8, and so that the outer side of said flange 11 will bear snugly against the shoulder formed by the flange 8. Owing to the threads 7 and 10, however, the parts may be adjusted to other positions, as, for example, the position shown in Fig. 1. Inward of the flange 11, the adjusting collar B comprises a plane extension 12, which is of the same internal diameter as the threaded portion 10, and which is adapted to embrace the washer 3 and the outer end of the axle box 2, as shown in Fig. 1 of the drawings.

13 indicates an external and annular rib or mud guard, which is adapted to lie in close relation to the hub of the wheel and to prevent the passage of mud and dirt into the nut or bearing. This rib or guard is not adapted, however, to engage the hub, but merely to lie adjacent to it, as will be understood.

The outer portion of the adjusting collar B is shaped to form an angular portion 14, which is provided in order that the adjusting collar may be engaged by a wrench and manipulated as the adjustment of the device may require.

Formed in the barrel 6 of the nut proper A, and extending throughout the length of the same, is the longitudinal groove 15, which is semicircular in cross-section and which terminates at its upper end in a transversely-extending recess 16. The threaded portion 10 of the adjusting collar B is provided with a similar groove 17, which is also semicircular in cross-section; and the two grooves are adapted to receive the pin or key 18, which fits therein and which extends throughout the length of the grooves 15 and 17, and which has its upper end bent transversely to form an arm or head 19, capable of and adapted to fit within the recess 16. By these means the pin or key 18 is prevented from moving out of its grooves 15 and 17, and the purpose of the said pin or key is to hold the sections A and B incapable of independent axial movement. Thus, when they have been adjusted to the proper degree, the pin or key 18 may be inserted in place, and by these means the sections are prevented from independent movement.

The use of my improvements will be well understood from the drawings, and very little explanation is, therefore, necessary.

By reference to the drawings it will be seen that the nut proper is made to screw over the nib of the axle, and that the adjusting collar is turned on the nut and made to move inwardly until the inwardly-projecting flange 11 bears against the outer end of the washer 3 and presses the same up against the adjacent portion of the axle box 2. This securely and immovably binds the parts against unnecessary movement, at the same time allowing the axle box free rotary movement on the axle journal, as is, of course, essential to its effective operation. If so desired, the space existing between the outer side of the flange 11 and the shoulder formed on the nut A by the flange 8, may be filled by suitable washers, either metallic or non-metallic; and in this event the secureness of the parts will be doubly insured. It is not, however, an absolute necessity, since the key 18 is capable of locking the parts with all necessary secureness.

The modification illustrated by Fig. 4 differs in the formation of the nut proper A, and this difference lies in the absence of the flange 8 of the preferred form. In the arrangement of Fig. 4 the flange 8 is dispensed with, and the passage 9 threaded internally, so that the shoulder at its inner end may bear against the shoulder formed by the nib 4, and also against the outer side of the flange 11. In other respects the device of Fig. 4 is similar to the preferred form of my invention and does not require any further description.

20 indicates a longitudinally disposed set-screw which is mounted in a threaded perforation of the squared portion 5 of section A, and which has its inner end arranged in the recess 16, and it operates to engage and hold the pin 18 from turning and consequent displacement.

Various changes in the form, proportion, and the minor details of construction may be resorted to without departing from the principle or sacrificing any of the advantages of this invention.

Having described the invention, I claim—

An axle-nut, comprising the section or body A, interiorly threaded and adapted to screw on a spindle of an axle, said section or body portion being exteriorly threaded and provided with a longitudinal groove and having a recess at the outer terminus of the groove, an adjustable collar or sleeve interiorly threaded and arranged on the section or body A and adapted to engage an axle and provided on its interior with a longitudinal groove corresponding with that of the body or section, a pin arranged within said grooves and locking the section or body and the collar or sleeve in their adjustment, and provided with an arm extending into said recess, the pin being capable of turning in the grooves to swing the arm upward out of the recess, and a set screw mounted on the section or body A and having its inner end arranged in the recess and engaging the arm of the pin and locking the latter against turning, substantially as and for the purpose described.

In testimony that I claim the foregoing as my own I have hereto affixed my signature in the presence of two witnesses.

ELI P. CHURCHWELL.

Witnesses:
J. J. WILLIAMS,
S. D. ECCLES.